(12) United States Patent
Panero et al.

(10) Patent No.: US 11,492,928 B2
(45) Date of Patent: Nov. 8, 2022

(54) FIXTURE FOR HOLDING A ROD GUIDE ASSEMBLY OF A FUEL CONTROL UNIT OF AN AIRCRAFT ENGINE DURING WELDING

(71) Applicant: PRATT & WHITNEY CANADA CORP., Longueuil (CA)

(72) Inventors: Samuel Panero, Montrëal (CA); Samuel Marcil Labelle, Chambly (CA); Eric D'Amour, Beloeil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/517,176

(22) Filed: Nov. 2, 2021

(65) Prior Publication Data

US 2022/0056816 A1 Feb. 24, 2022

Related U.S. Application Data

(62) Division of application No. 16/439,079, filed on Jun. 12, 2019, now Pat. No. 11,187,110.

(51) Int. Cl.
| | |
|---|---|
| *F01D 25/28* | (2006.01) |
| *B23K 26/34* | (2014.01) |
| *B23P 6/00* | (2006.01) |

(52) U.S. Cl.
CPC ............ *F01D 25/28* (2013.01); *B23K 26/34* (2013.01); *B23P 6/007* (2013.01); *F05D 2230/80* (2013.01)

(58) Field of Classification Search
CPC ..... F01D 25/28; B23K 26/34; B23K 15/0006; B23K 15/002; B23K 15/008; B23K 15/0093; B23K 15/04; B23K 15/06; B23K 37/0443; B23K 2101/001; B23K 2103/26; B23P 6/007; F05D 2230/80; F02C 7/232; F02C 7/22

See application file for complete search history.

(56) References Cited

U.S. PATENT DOCUMENTS

| | | | |
|---|---|---|---|
| 3,527,056 A * | 9/1970 | Hoffman | F02K 9/52 60/39.27 |
| 5,328,340 A | 7/1994 | Hara et al. | |
| 5,421,245 A | 6/1995 | Christoffel et al. | |
| 7,165,401 B2 | 1/2007 | McEwen et al. | |
| 7,687,151 B2 | 3/2010 | Finton et al. | |
| 8,484,978 B2 | 7/2013 | Bailey et al. | |
| 9,739,204 B2 | 8/2017 | Bird | |
| 2003/0103843 A1 | 6/2003 | Seo | |
| 2005/0241309 A1 | 11/2005 | McEwen et al. | |
| 2006/0228573 A1 * | 10/2006 | Finton | B23K 31/022 428/575 |

(Continued)

OTHER PUBLICATIONS

G. Schubert, Electron Beam Welding—Process, Applications and Equipment, Proceedings of the IIW International Conference on Advances in Welding and Allied Technologies, Jul. 16-17, 2009, Singapore.

*Primary Examiner* — Lawrence Averick
(74) *Attorney, Agent, or Firm* — Norton Rose Fulbright Canada LLP

(57) ABSTRACT

A method of repairing a rod guide assembly of a fuel control unit of an aircraft engine is provided. The method comprises disconnecting a used spring seat from the rod of the rod guide assembly and welding a replacement spring seat to the rod using an electron beam controlled using a circular beam deflection pattern.

5 Claims, 9 Drawing Sheets

(56) References Cited

U.S. PATENT DOCUMENTS

| | | | |
|---|---|---|---|
| 2008/0216518 A1* | 9/2008 | Yoo | D06F 39/10 |
| | | | 68/12.13 |
| 2009/0256007 A1 | 10/2009 | McMasters et al. | |
| 2011/0107764 A1 | 5/2011 | Bailey et al. | |
| 2014/0345250 A1 | 11/2014 | Bird | |
| 2018/0030988 A1 | 2/2018 | Garrard et al. | |
| 2018/0216518 A1* | 8/2018 | Graham | B23K 26/211 |
| 2019/0084103 A1* | 3/2019 | Gontarski | F01D 25/285 |

* cited by examiner

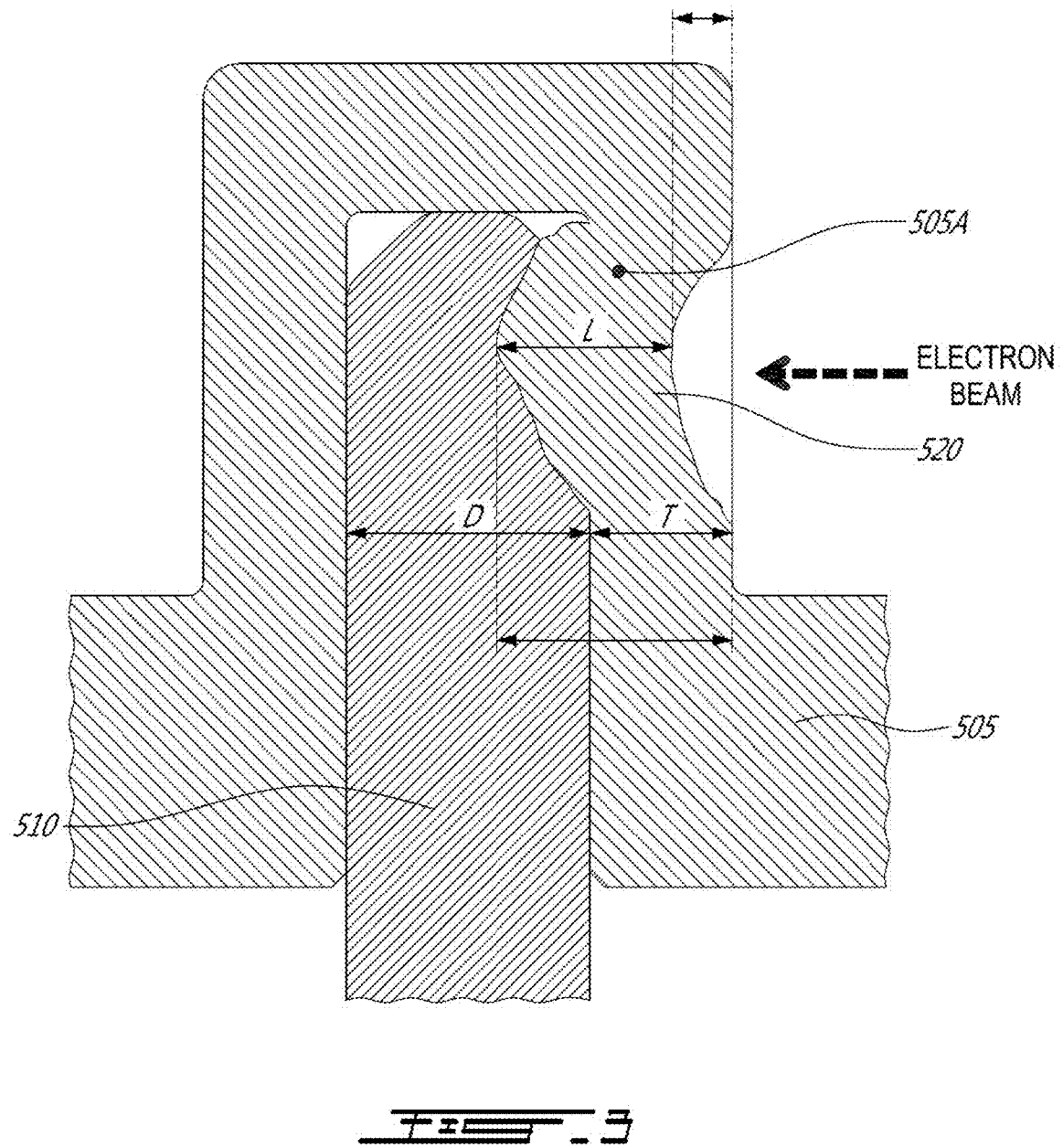

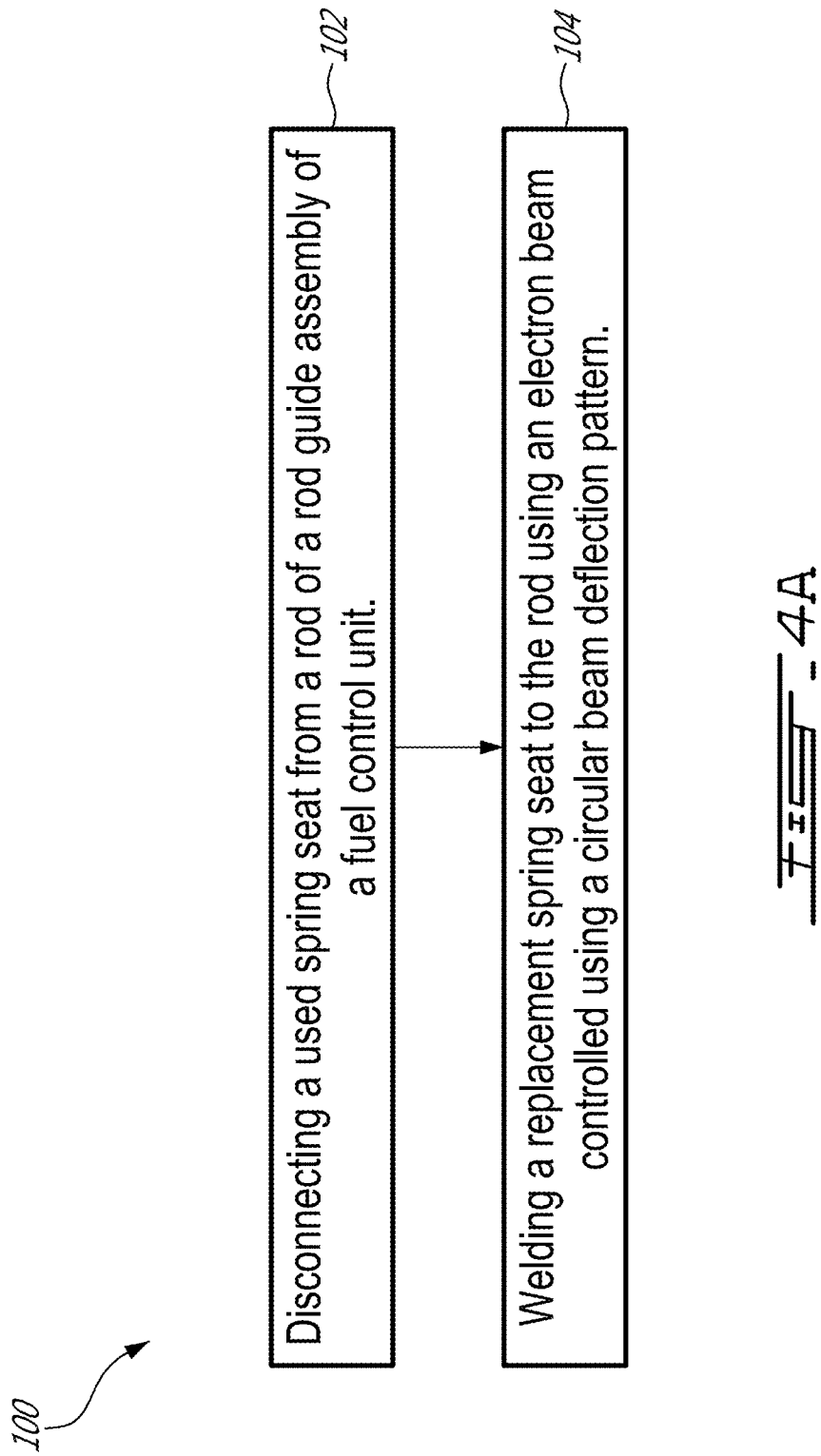

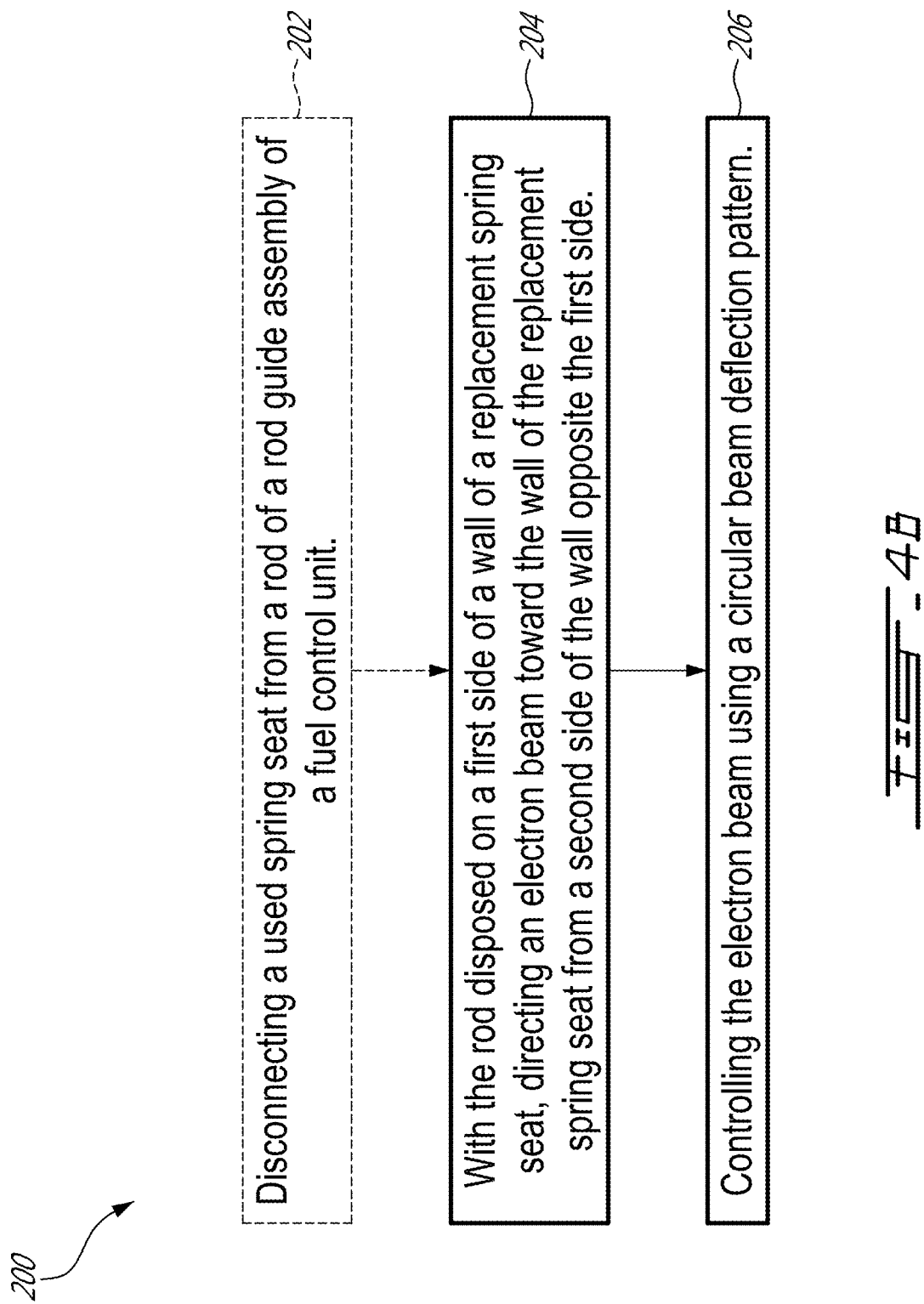

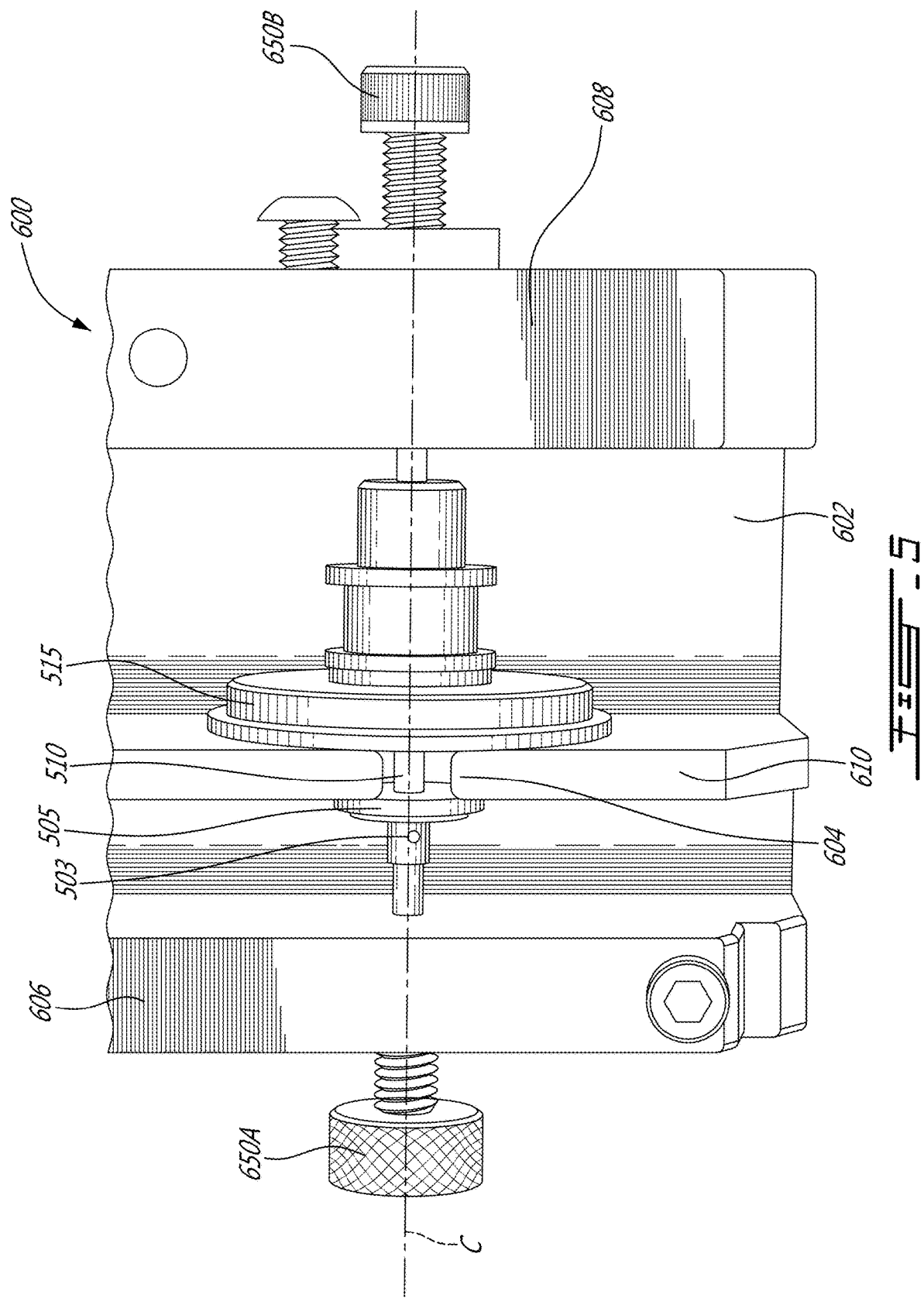

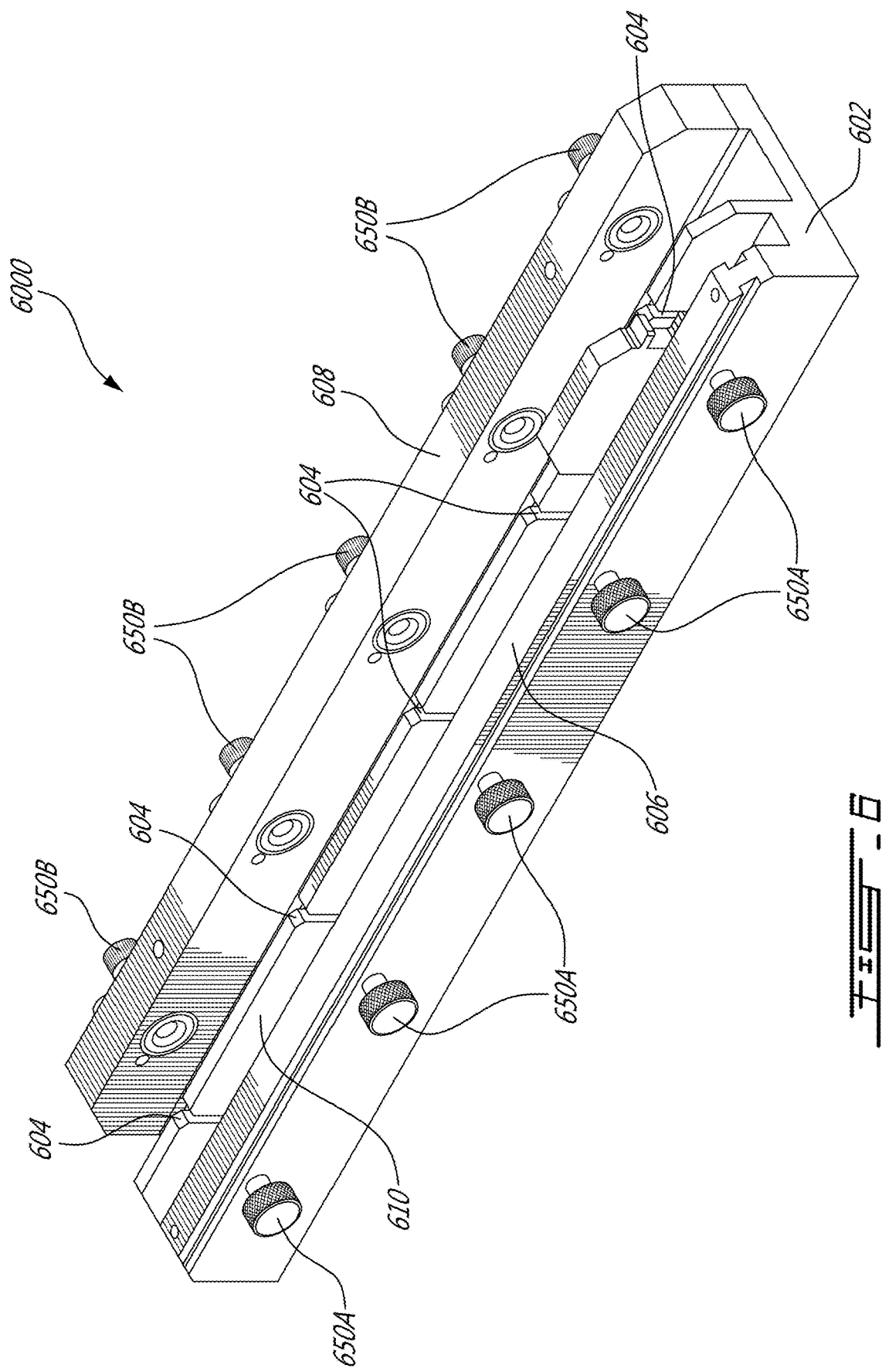

FIXTURE FOR HOLDING A ROD GUIDE ASSEMBLY OF A FUEL CONTROL UNIT OF AN AIRCRAFT ENGINE DURING WELDING

CROSS REFERENCE TO RELATED APPLICATION

This application is a division of U.S. patent application Ser. No. 16/439,079 filed on Jun. 12, 2019, the entire contents of which are hereby incorporated by reference.

FIELD

This relates generally to engine maintenance, and more particularly to maintenance of fuel control units of aircraft engines.

BACKGROUND

Maintenance of aircraft engines is often mandated to occur at prescribed intervals to ensure performance and reliability. Such maintenance may result in the destruction and replacement of some components in order to perform the required maintenance. Replacement of such components can be costly.

SUMMARY

According to an aspect, there is provided a method of repairing a rod guide assembly of a fuel control unit of an aircraft engine where a used spring seat has been disconnected from the rod of the rod guide assembly. The method comprises:

welding a replacement spring seat to the rod by:

with the rod disposed on a first side of a wall of the replacement spring seat, directing an electron beam toward the wall of the replacement spring seat from a second side of the wall opposite the first side; and controlling the electron beam using a circular beam deflection pattern.

According to another aspect, there is provided another method of repairing a rod guide assembly of a fuel control unit of an aircraft engine. The method comprises:

disconnecting a used spring seat from the rod of the rod guide assembly; and welding a replacement spring seat to the rod using an electron beam controlled using a circular beam deflection pattern.

According to another aspect, there is provided a fixture for holding a rod guide assembly of a fuel control unit of an aircraft engine during welding. The fixture comprises:

a base;

a first clamp counterpart movably coupled to the base, a position of the first clamp counterpart being adjustable along a clamping direction;

a second clamp counterpart coupled to the base and spaced apart from the first clamp counterpart along the clamping direction; and a rod seat coupled to the base and disposed between the first clamp counterpart and the second clamp counterpart, the rod seat being configured to engage with the rod of the rod guide assembly and keep a longitudinal axis of the rod in substantial alignment with the clamping direction.

Other features will become apparent from the drawings in conjunction with the following description.

BRIEF DESCRIPTION OF DRAWINGS

In the figures which illustrate example embodiments,

FIG. 3 is a cross-sectional view of a welded CDP rod guide assembly;

FIG. 4A is a flowchart of a method of repairing a rod guide assembly of a fuel control unit of the engine;

FIG. 4B is a flowchart of another method of repairing a rod guide assembly of a fuel control unit of the engine;

FIG. 5 is an illustration of a CDP rod guide assembly mounted to an example welding fixture; and FIG. 6 is a perspective view of another example fixture for welding multiple CDP rod guide assemblies.

DETAILED DESCRIPTION

Aspects of various embodiments are described through reference to the drawings.

Figure 1A:
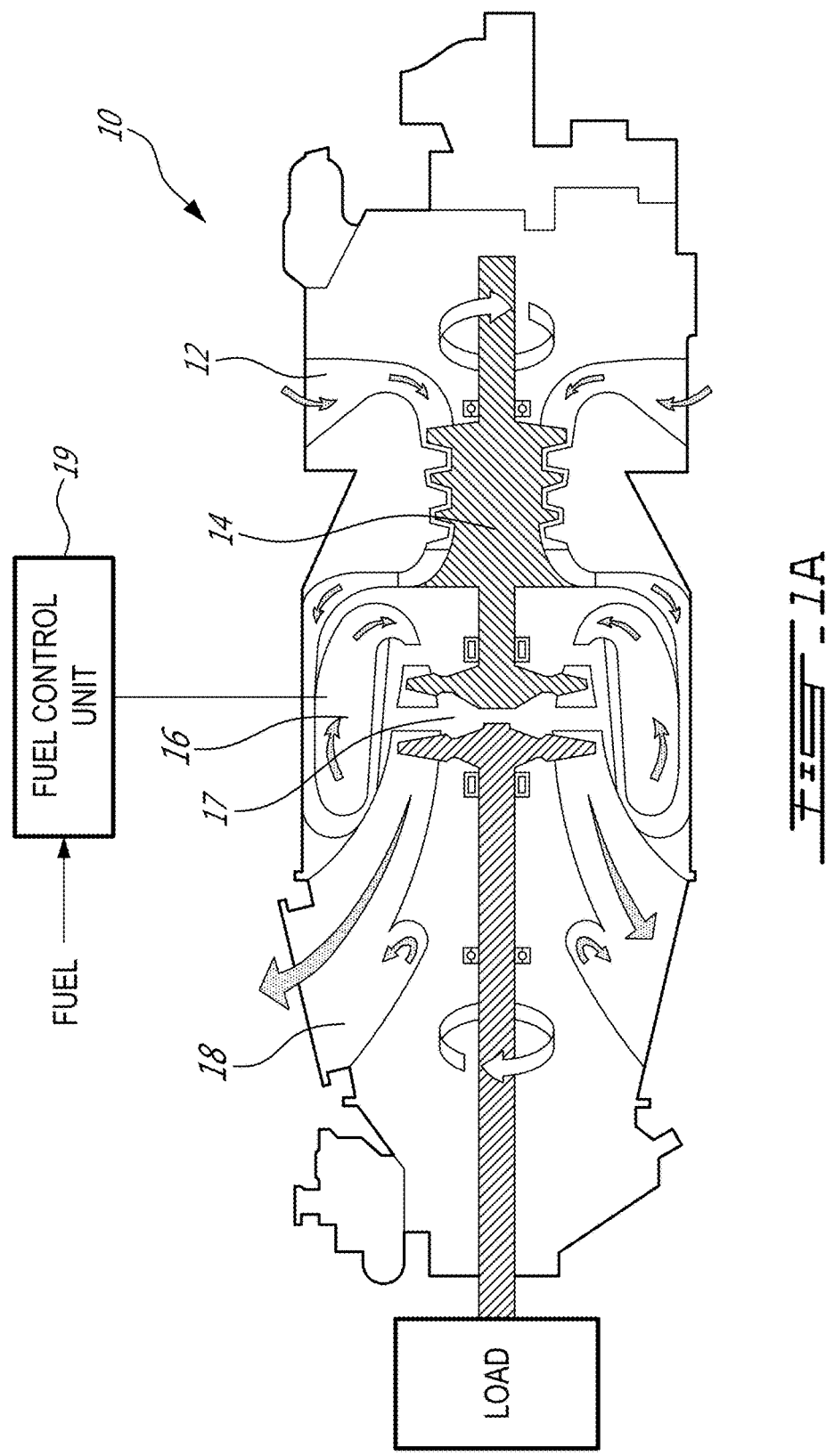
FIG. 1A is a schematic axial cross-sectional view of a gas turbine engine.

FIG. 1 is a schematic representation of an exemplary turboshaft engine 10. It is understood that aspects of the present disclosure may be applicable to other types of gas turbine engines. Engine 10 may comprise, in serial flow communication, air intake 12 through which ambient air is received, multistage compressor 14 for pressurizing the air, combustor 16 in which the compressed air is mixed with fuel and ignited for generating an annular stream of hot combustion gases, turbine section 17 for extracting energy from the combustion gases, and exhaust duct 18 via which the combustion gases exit engine 10. Engine 10 may also include fuel control unit 19 that may be used to control fuel flow to combustor 16.

Figure 1B:
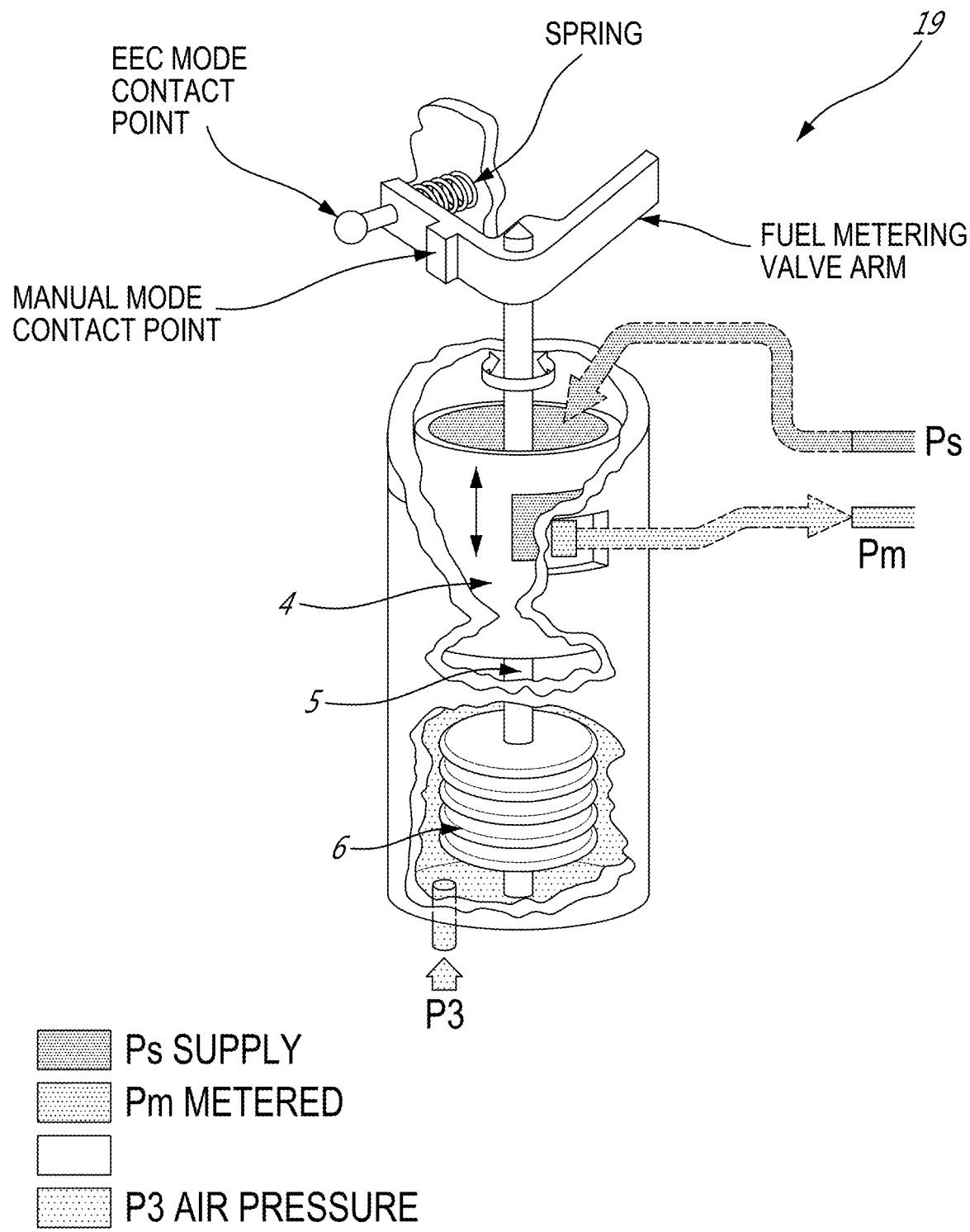
FIG. 1B is a schematic diagram of an example compressor discharge pressure (CDP) rod guide assembly components installed in a fuel control unit for a gas turbine engine.

FIG. 1B is a simplified diagram of components of an example rod guide assembly installed in fuel control unit 19. The fuel control unit 19 may regulate the flow of fuel being delivered to combustor 16 of engine 10 via suitable fuel nozzles. As depicted in FIG. 16, the fuel control unit 19 may include fuel metering valve 4 and bellows assembly 6 connected via compressor discharge pressure (CDP) rod guide assembly 5. In some embodiments, fuel control unit 19 may also include a fuel metering valve arm, a spring, a manual contact point and an electronic engine controller (EEC) mode contact point.

In some embodiments, the amount of fuel delivered to the fuel nozzles may be a function of various parameters. One such parameter is the compressor discharge pressure of gas turbine engine 10. Changes in compressor discharge pressure may affect the position of fuel metering valve 4 and bellows assembly 6. In response to changes in compressor discharge pressure, rod 510 of CDP rod guide assembly 5 (depicted in FIGS. 2A and 2B) may be displaced along body 515, while spring seat 505 of CDP rod guide assembly 5 interacts with a fuel metering valve spring (not shown).

After a certain period of time, engine 10 may require maintenance (e.g., an overhaul). An overhaul may require taking apart and inspecting various components of engine 10, including fuel control unit 19. An overhaul may be required after a pre-defined performance threshold has been reached. Such a threshold may include a pre-defined amount of time in operation, a pre-defined number of takeoff and landing cycles, a pre-defined distance travelled, or the like.

In some embodiments, maintenance tasks may include disassembly, cleaning, inspection, repair or replacement of certain components and assembly(ies), and testing of fuel control unit 19. In some situation, disassembly of fuel control unit 19 may require the destruction of CDP rod guide assembly 5. In other words, disassembly of fuel control unit 19 may require rendering CDP rod guide assembly 5 unsuitable for continued use and therefore require replacement of CDP rod guide assembly 5.

Figure 2A:
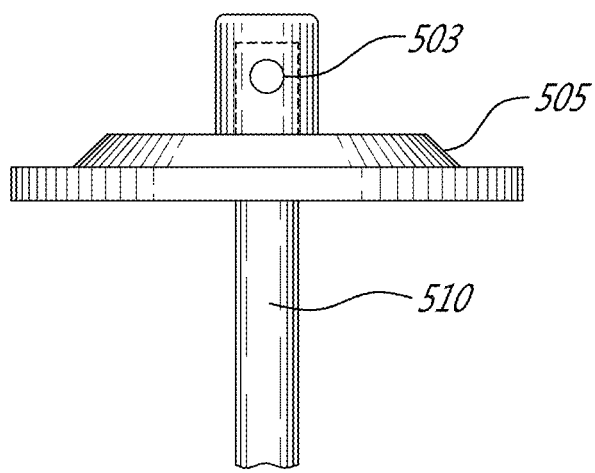
FIG. 2A is a side view of an upper portion of the CDP rod guide assembly of the fuel control unit in a state prior to welding a replacement spring seat to a rod of the CDP rod guide assembly.

FIG. 2A is a side view of an upper portion of CDP rod guide assembly 5 in a state prior to welding replacement spring seat 505 to rod 510. Replacement spring seat 505 may include hole 503 extending through wall 505A (see FIG. 3) at future weld region 520 (see FIG. 2B) and may facilitate welding using electron beam welding. In some embodiments, hole 503 may have a diameter of about 0.8 mm. Hole 503 may extend radially relative to a longitudinal axis of rod 510.

Figure 2B:
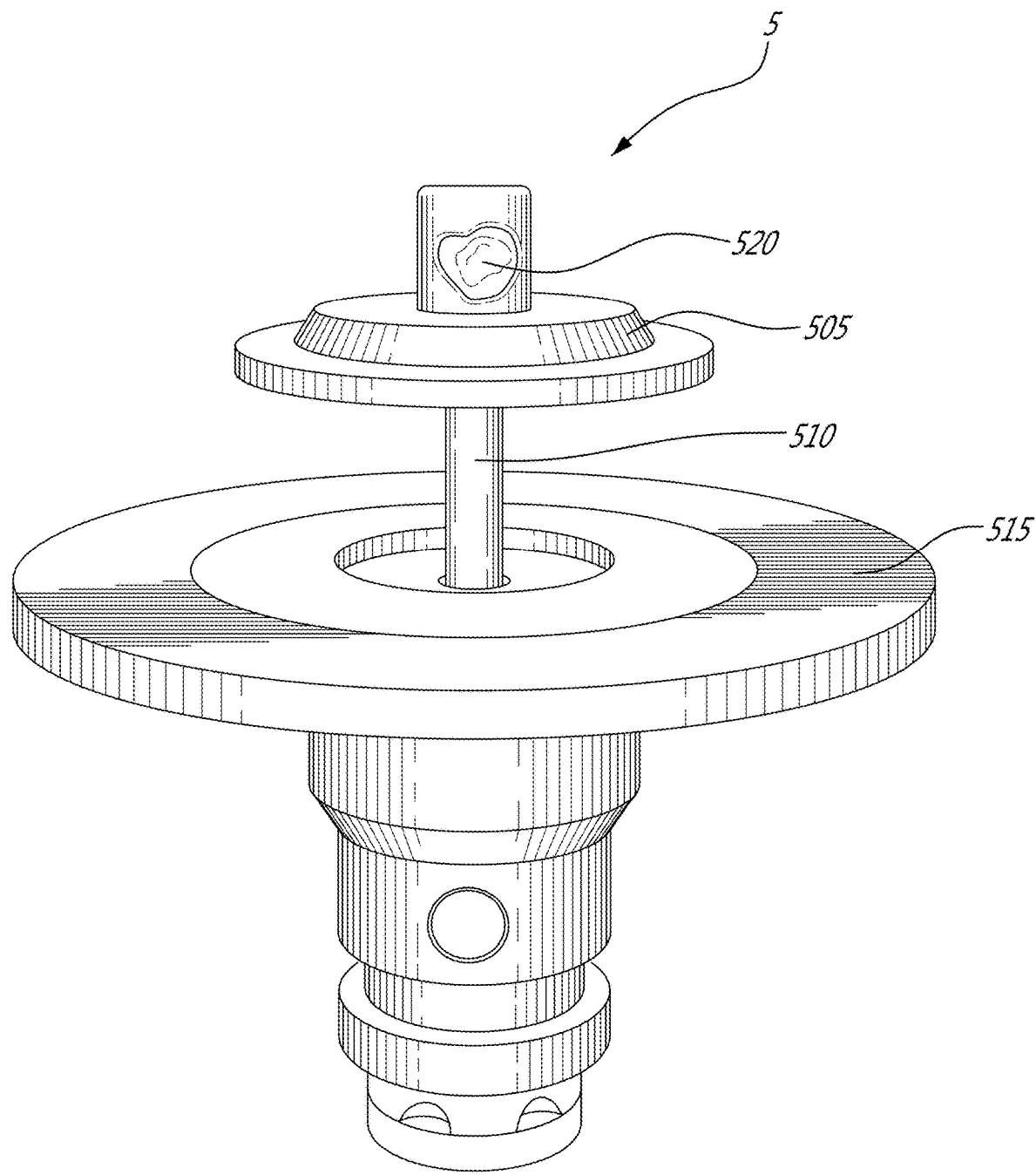
FIG. 2B is a side perspective view of the CDP rod guide assembly of the fuel control unit in a state after welding the replacement spring seat to the rod of the CDP rod guide assembly.

FIG. 2B is a side perspective view of an example CDP rod guide assembly 5. In some embodiments, CDP rod guide assembly 5 may have an overall height along rod 510 of about 2.5 cm. As depicted, CDP rod guide assembly 5 may include spring seat 505, rod 510, and body 515. Spring seat 505 may be substantially circular in profile and may include a central hole configured to receive rod 510. The term "substantially" as used herein may be applied to modify any quantitative representation which could permissibly vary without resulting in a change in the basic function to which it is related. Spring seat 505 may be secured to rod 510 so that spring seat 505 and rod 510 may move together. In some embodiments, rod 510 may be configured to freely slide or otherwise be displaced along body 515 via a hole extending into body 515.

To perform an overhaul of fuel control unit 19, CDP rod guide assembly 5 may be removed from fuel control unit 19. Previously known maintenance practices for such components require users to dispose of the entire CDP rod guide assembly 5 and replace it with a new CDP rod guide assembly 5 each time an overhaul is performed on fuel control unit 19. As such, it is wasteful to replace a used CDP rod guide assembly 5 with a new CDP rod guide assembly 5 each time an overhaul is performed. Moreover, CDP rod guide assemblies 5 are costly.

There is no known method for overhauling fuel control unit 19 without disposing of CDP rod guide assembly 5. During an overhaul of fuel control unit 19, it may be necessary to disconnect spring seat 505 from rod 510 without any way of re-securing spring seat 505 to rod 510 that is suitable for continued use of CDP rod guide assembly 5. For example, spring seat 505 and rod 510 may be secured by way of a weld or otherwise, and disconnecting spring seat 505 from rod 510 may include machining and/or grinding spring seat 505 from rod 510 for example. In other words, disconnecting spring seat 505 from rod 510 may result in destroying spring seat 505.

In some embodiments, methods disclosed herein may allow components of the CDP rod guide assembly 5 of fuel control unit 19 to be salvaged and re-used after an overhaul. For example, the methods disclosed herein may allow for a replacement spring seat 505 to be secured to the existing (i.e., used) rod 510 in a suitable manner permitting the re-use of rod 510 and of body 515.

FIG. 3 is a cross-sectional image of an upper portion of CDP rod guide assembly 5 showing a replacement spring seat 505 after having been welded to rod 510 at weld region 520. In some embodiments, the replacement (i.e., new) spring seat 505 can be welded to rod 510 at weld region 520 using electron beam welding with a circular deflection pattern, which may be suitable for welding such relatively small parts. For example, in some embodiments, a thickness T of wall 505A of spring seat 505 at weld region 520 may be about 0.8 mm before welding. In various embodiments, the thickness T of wall 505A of spring seat 505 at weld region 520 may be between 0.5 mm and 1 mm before welding. In some embodiments, a diameter D of a portion of rod 510 to be welded to spring seat 505 may be about 1.6 mm. In various embodiments, the diameter D of the portion of rod 510 to be welded to spring seat 505 may be between 1.5 mm and 1.8 mm. In some embodiments, a penetration L of a weld between rod 510 and wall 505A of spring seat 505 may be about 0.75 mm. In some embodiments, penetration L of a weld between rod 510 and wall 505A of spring seat 505 may be between 0.5 mm and 1.5 mm.

Rod 510 may have a cylindrical shape with a circular outer cross-sectional profile. Wall 505A of spring seat 505 at the location of weld region 520 may be at least partially annular and extend partially around rod 510. Wall 505A of spring seat 505 may define a receptacle into which an end of rod 510 is received. In some embodiments, rod 510 and spring seat 505 may both be made from a martensitic precipitation-hardening stainless steel (e.g., type 17-4 PH).

FIG. 4A is a flowchart of a method 100 of repairing rod guide assembly 5 of fuel control unit 19 of engine 10. Method 100 may comprise:

disconnecting used spring seat 505 from rod 510 of rod guide assembly 5 (see block 102); and welding replacement spring seat 505 to rod 510 using an electron beam controlled using a circular beam deflection pattern (see block 104).

FIG. 4B is a flowchart of another method 200 of repairing rod guide assembly 5 of fuel control unit 19 of engine 10. Aspects of methods 100 and 200 may be combined together. Method 200 may comprise:

disconnecting used spring seat 505 from rod 510 of CDP rod guide assembly 5 of fuel control unit 19 (see optional block 202); and welding replacement spring seat 505 to rod 510 by:

with rod 510 disposed on a first side of wall 505A of the replacement spring seat 505, directing an electron beam toward wall 505A of the replacement spring seat 505 from a second side of wall 505A opposite the first side (see block 204); and controlling the electron beam using a circular beam deflection pattern (see block 206).

The first side of wall 505A may be a radially-inner side of wall 505A and the second side of wall 505 may be a radially-outer side of wall 505A.

Spring seat 505 may be placed in a pre-welding configuration with rod 510. Such pre-welding configuration may be a positioning of spring seat 505 in close proximity (e.g., in physical contact) with rod 510 so as to permit welding (e.g., via hole 503).

In some embodiments, a replacement spring seat 505 may be fabricated or obtained and welded to rod 510. It is contemplated that methods disclosed herein may also be suitable for welding an original spring seat 505 to rod 510.

Using electron beam welding, a pattern generator can be programmed to provide a customizable oscillation pattern. Such oscillation pattern may allow for a beneficial effect on the depth-to-width ratio, bead appearance, and consistency of welding performance. A low frequency deflection system can be used to produce a circular movement in a small area, which has the effect of "stirring" the weld pool. The deflection pattern can be selected to achieve precise control over the fusion zone shape and over surface heat treatment patterns and cooling rate. In some embodiments, the electron beam welding device is configured to perform the weld using pre-defined operating parameters. In some embodiments, these operating parameters include one or more of a current of about 2 mA, a voltage of 120 kV, a speed of about 58 cm/minute, a frequency of about 2 Hz, and/or a circular deflection pattern. It has been found that such operating parameters may yield a weld suitable for securing spring seat 505 to rod 510. The use of electron beam welding with a circular deflection pattern may allow for precise control over the weld in the relatively small weld region 520.

The circular deflection pattern may be suitable for welding at the location of circular hole 503 (shown in FIG. 2A) by having the electron beam cause melting of the material at the edge of hole 503. For example, the electron beam may be controlled to follow the edge of hole 503 and cause melting of the material at the edge of hole 503. The diameter of a circular path followed by the electron beam may be slightly larger than the diameter of hole 503.

As depicted in FIG. 3 weld region 520 may be disposed on one side of rod 510. In some embodiments, the electron beam welding may result in an underfill along wall 505A of spring seat 505. In some embodiments, weld region 520 may have a depth of about 0.4 mm. In some embodiments, an example penetration depth of weld region 520 relative to the radially outermost point of wall 505A of spring seat 505 may be about 1.5 mm. It should be noted that these dimensions are merely examples and may vary between different parts, applications and welding parameters.

FIG. 5 is an illustration of a replacement spring seat 505, rod 510 and body 515 held in the pre-welding configuration by welding fixture 600. As depicted, welding fixture 600 may include screws 650a, 650b which can apply pressure to spring seat 505 and body 515 (i.e. both ends of CDP rod guide assembly 5), to provide clamping and/or contact between spring seat 505 and rod 510 during the electron beam welding process.

Fixture 600 may include base 602, a first clamp counterpart, a second clamp counterpart and rod seat 604. One or both first and second clamp counterparts may be movably coupled to base 602. Accordingly, a position of one or both first and second clamp counterparts may be being adjustable along clamping direction C. The first clamp counterpart may include a threaded fastener such as screw 650A, threadably engaged with first protrusion 606 disposed on (e.g., extending from) base 602. The second clamp counterpart may include a threaded fastener such as screw 650B, threadably engaged with second protrusion 608 disposed on (e.g., extending from) base 602. Screws 650A and 650B may be coupled to base 602 and spaced apart from each other along clamping direction C.

Rod seat 604 may be coupled to base 602 and disposed between screws 650A, 650B. Rod seat 604 may be configured to engage with rod 510 of CDP rod guide assembly 5 and keep a longitudinal axis of rod 510 in substantial alignment with clamping direction C. Rod seat 604 may include a slot formed in third protrusion 610 disposed on (i.e., extending from) base 602.

Placing replacement spring seat 505 and rod 510 in a pre-welding configuration may include securing (e.g., clamping along clamping direction C) spring seat 505, rod 510 and body 515 in welding fixture 600 via screws 650A, 650B and rod seat 604. Welding fixture 600 may then placed inside an electron beam welding device to perform the weld. Screws 650A, 650B may be used to axially clamp spring seat 505 to an end of rod 510 to permit welding of spring seat 505 and rod 10 together. In some embodiments of fixture 600, rod 510 and screws 650A, 650B may be substantially coaxial when CDP rod guide assembly 5 is mounted in fixture 600.

FIG. 6 is an isometric view of another example welding fixture 6000 having elements in common with welding fixture 600. Like elements are identified using like reference numerals. Welding fixture 6000 may define multiple stations for receiving respective CDP rod guide assemblies 5 to be welded in a batch. Welding fixture 6000 may be modified to define a desired number of stations. As depicted, welding fixture 6000 may include base 602 and protrusions 606, 610 and 608 extending from base 602. Protrusions 606, 610 and 608 may be shaped as bars. Protrusion 606 may be spaced apart from middle protrusion 610 to define a gap suitable for receiving spring seat 505. Protrusion 606 may have a plurality of threaded holes formed therein and adapted to receive respective screws 650A for each station. Protrusion 608 may be spaced apart from protrusion 610 to define a gap suitable to accommodate body 515 of CDP rod guide assembly 5. Protrusion 608 may have a plurality of threaded holes formed therein and adapted to receive respective screws 650B for each station. Protrusion 610 may define a plurality of rod seats 604 (e.g., slots or grooves) adapted to receive respective rods 510. In some embodiments, each rod seat 604 may be aligned with corresponding screws 650A and 650B, such that rod 510 and screws 650A, 650B are substantially coaxial.

Welding fixture 6000 (or weld fixture 600 of FIG. 5) may be placed into an electron beam welding system. An electron beam welding system includes a vacuum chamber with a table or platform upon which the article to be welded by electron beam welding is placed and secured. In some embodiments, the electron beam welding system may be programmed to perform welds for multiple spring seats 505 and rods 510 in succession when multiple spring seats 505 and rods 510 are secured in welding fixture 6000. This may be performed, for example, by configuring the electron beam welding system to move welding fixture 6000 along a pre-defined path after performing a weld on a first set of spring seat 505 and rod 510. In this manner, multiple CDP rod guide assemblies 5 may be overhauled as part of a single, pre-programmed electron beam welding process. This may reduce the time required for loading the electron beam welding apparatus compared to placing only one spring seat 505 and rod 510 in the electron beam welding apparatus at a time. Moreover, the process of achieving a desired vacuum level within the vacuum chamber of the electron beam welding system is a time-consuming process, so the capability of overhauling multiple CDP rod guide assembles 5 in a single process may result in time savings.

The methods and fixtures disclosed herein are not limited for used to overhaul CDP rod guide assemblies of fuel control units but may also be used for other applications. For example, aspects of method 100 can be adapted to secure a component to a rod where the component has a wall with a first side for facing the rod and a second side opposite the first side. With the rod disposed on the first side of the wall of the component, welding the component to the rod can be achieved by:

directing an electron beam toward the wall of the component from the second side of the wall of the component; and controlling the electron beam using a circular beam deflection pattern.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A fixture for holding a rod guide assembly of a fuel control unit of an aircraft engine during welding, the fixture comprising:

a base;

a first clamp counterpart movably coupled to the base, a position of the first clamp counterpart being adjustable along a clamping direction;

a second clamp counterpart coupled to the base and spaced apart from the first clamp counterpart along the clamping direction; and a rod seat coupled to the base and disposed between the first clamp counterpart and the second clamp counterpart, the rod seat being configured to engage with the rod of the rod guide assembly and keep a longitudinal axis of the rod in substantial alignment with the clamping direction.

2. The fixture of claim 1, wherein the first clamp counterpart includes a first threaded fastener.

3. The fixture of claim 2, wherein the second clamp counterpart includes a second threaded fastener.

4. The fixture of claim 3, wherein the rod seat comprises a slot formed in a protrusion disposed on the base.

5. The fixture of claim 1, wherein:

the first clamp, second clamp and the rod seat define a first station for holding the rod guide assembly; and the fixture comprises a second station for holding another rod guide assembly.

* * * * *